(12) United States Patent
Hansson et al.

(10) Patent No.: US 7,264,424 B2
(45) Date of Patent: *Sep. 4, 2007

(54) TOOL HEAD FOR A MACHINING TOOL

(75) Inventors: Per Hansson, Gävle (SE); Erik Berminge, Gavle (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/991,438

(22) Filed: Nov. 19, 2004

(65) Prior Publication Data

US 2005/0180824 A1    Aug. 18, 2005

(30) Foreign Application Priority Data

Nov. 19, 2003   (SE) ..................................... 0303077

(51) Int. Cl.
  *B26D 7/26*   (2006.01)
  *B26D 1/00*   (2006.01)
(52) U.S. Cl. ...................................... 407/109; 407/107
(58) Field of Classification Search ................ 407/109, 407/110, 111, 50, 107, 108, 101
See application file for complete search history.

(56) References Cited

U.S. PATENT DOCUMENTS

| | | |
|---|---|---|
| 3,775,818 A | 12/1973 | Sirola |
| 4,235,564 A | 11/1980 | Huser |
| 4,887,945 A | 12/1989 | Pano |
| 5,112,164 A | 5/1992 | Pano |
| 5,207,537 A | 5/1993 | Englund |
| 5,833,403 A * | 11/1998 | Barazani ...................... 407/101 |
| 5,921,724 A * | 7/1999 | Erickson et al. ............ 407/117 |
| 6,086,291 A | 7/2000 | Hansson et al. |
| 6,186,704 B1 | 2/2001 | Hale |
| 6,270,294 B1 | 8/2001 | Sjöö et al. |
| 2005/0207853 A1 | 9/2005 | Hansson et al. |

FOREIGN PATENT DOCUMENTS

| | | |
|---|---|---|
| CH | 688 794 | 3/1988 |
| DE | 33 01 919 | 7/1984 |
| DE | 101 49 426 | 4/2002 |
| EP | 1 025 939 | 8/2000 |
| WO | WO 03/106084 | 12/2003 |
| WO | 2004/105983 A1 | 12/2004 |
| WO | 2005/000519 A2 | 1/2005 |
| WO | 2005/000519 A3 | 1/2005 |

* cited by examiner

*Primary Examiner*—Willmon Fridie, Jr.
(74) *Attorney, Agent, or Firm*—Drinker Biddle & Reath LLP

(57) ABSTRACT

A tool head, which is adapted to receive a cutting insert for chip removal machining, includes a basic holder which has a lower support part and an upper clamping portion defining therebetween and insert-receiving pocket. A slot extends through the basic holder at a location spaced from the pocket, wherein the clamping portion is joined to a remaining portion of the basic holder by a hinge portion about which the clamping portion is elastically displaceable toward the cutting insert. A recess extends through the basic holder parallel to the slot and in communication therewith for receiving a nut roll. A clamping screw extends through a bore of the basic holder and into engagement with the nut roll, wherein the clamping screw is operable to displace the nut roll into the slot to expand the slot and thereby elastically displace the clamping portion about the hinge and toward the cutting insert.

13 Claims, 1 Drawing Sheet

TOOL HEAD FOR A MACHINING TOOL

The present application claims priority under 35 U.S.C. §119 to Patent Application Ser. No. 0303077-2 filed in Sweden on Nov. 19, 2003, the entire content of which is hereby incorporated by reference.

BACKGROUND

The present invention is related to a tool head of the kind intended for chip removing machining of metal. The tool head comprises a basic holder and an insert holder connected therewith. More specifically, the tool is intended for the type of machining referred to as parting and grooving.

Within the field of chip removing machining there are couplings of various kinds in order to achieve a torque resistant connection between different holders and adapters, especially in turning tools of various kinds. For instance, Swedish patent application 7813038-2 (corresponding to Huser U.S. Pat. No. 4,235,564) discloses a tool for parting and grooving, wherein cooperating serrations with clamping screws as clamping means are used for clamping an adapter to a holder. The number of screws for clamping the adapter to the holder is three in this case, which means that the activity required for first disengaging three comparatively long screws and subsequently tightening them again after an insert change results in a rather time consuming change of inserts.

Further, Swedish patent application 9004032-0 (corresponding to Englund U.S. Pat. No. 5,207,537) discloses a cutting tool, comprising a cutting insert clamped in an insert pocket in a holder blade, wherein the cutting insert is clamped by a pin-type press means engaging in a slot, inclined at an angle towards the insert pocket, such that an upper clamping arm portion of the holder blade is subjected to elastic deflection towards the upper surface of the insert. Due to the fact that the press means is constituted by a relatively long pin, this system becomes relatively space-consuming in a narrow holder blade for a parting tool.

OBJECT AND SUMMARY OF THE INVENTION

An object of the present invention is to provide a tool head for chip removing metal machining tools, which, in relation to previously known tools of the kind in question, has improved characteristics regarding clamping of the cutting insert and enables a more simple insert change.

According to the invention this object is attained by a tool head which is adapted to receive a cutting insert for chip removal machining. The tool head comprises a basic holder including a lower support part and an upper clamping portion defining therebetween an insert-receiving pocket. A slot extends through the basic holder at a location spaced from the pocket, wherein the clamping portion is joined to a remaining portion of the basic holder by a hinge portion about which the clamping portion is elastically displaceable toward the lower support part. A recess extends through the basic holder parallel to the slot and in communication therewith. A nut roll is positioned within the recess. A clamping screw extends through a bore of the basic holder and into engagement with the nut roll, wherein the clamping screw is operable to displace the nut roll into the slot to elastically displace the clamping portion about the hinge portion and toward the support part.

BRIEF DESCRIPTION OF THE DRAWINGS

Below follows a detailed description of preferred embodiments of the present invention cited as examples, reference being made to the appended drawings, in which.

DESCRIPTION OF PREFERRED EMBODIMENTS

Figure 1:
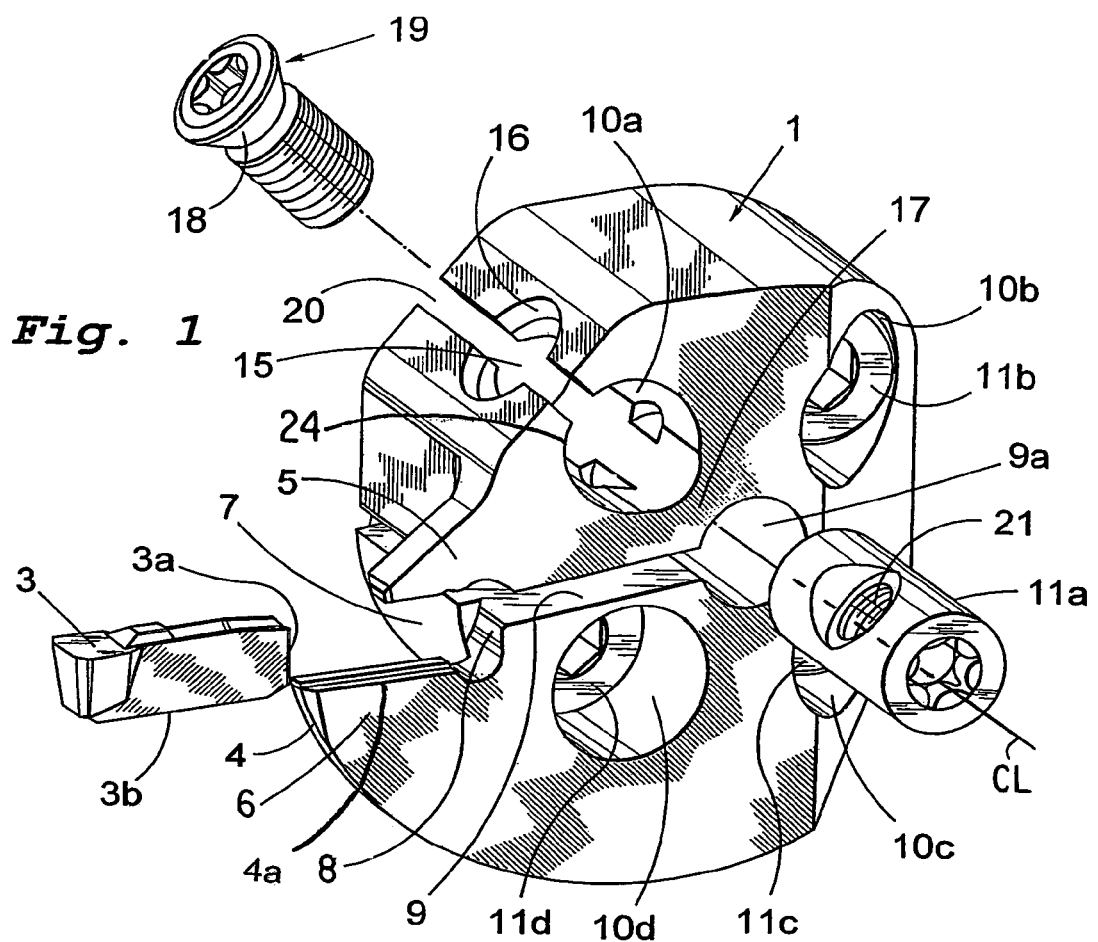
FIG. 1 is a perspective exploded view showing a tool according to a first preferred embodiment of the invention, comprising a holder and an adapter in the form of a cutting tool head, the holder as well as the adapter being schematically illustrated.

FIG. 1 illustrates a tool head for chip removing metal machining tools according to a first preferred embodiment of the present invention. The tool head comprises a basic holder 1 having a central bore 9a for engagement with a tool machine. The basic holder 1 includes an integral insert holder 4 which projects laterally with respect to the axis of the bore 9a. The basic holder is preferably intended to be connected, via an engagement part adapted to this purpose, to a tool machine, for instance a multi-purpose lathe. The insert holder 4 is constituted by a blade-shaped portion, which forms an insert pocket 7 in the form of a clamping slot for receiving a cutting insert 3 for chip removing machining. The insert pocket 7 is formed between a lower support part 6, supporting the insert 3, and an upper clamping portion 5, formed integrally in one piece with the lower support part 6, the upper clamping portion having a smaller width than the rest of the basic holder 1.

The rear end surface 3a of the cutting insert 3 is intended to abut against a shoulder 8, which limits the inward longitudinal displacement of the cutting insert within the pocket 7. The shoulder 8 is formed on the lower support part 6. The clamping slot 7 transforms rearwardly into a slot extension 9, extending in the longitudinal direction of the pocket 7, said slot extension 9 having considerably shorter slot height than the front clamping slot 7. The end portion of the slot extension 9 is designated 9a.

The lower surface 3b of the cutting insert is preferably oriented in a direction perpendicular to both the rear part 3a of the cutting insert and said lower surface 3b, and is parallel with the intended feed direction of the tool head during a cutting operation. The rear part of the upper surface of the cutting insert and the lower surface 3b of the cutting insert have, preferably, been formed with concave V-shaped wedge-type grooves in the manner shown and described in the Swedish patent application 9703434-2 (corresponding to Hansson et al. U.S. Pat. No. 6,086,291.

The basic holder is provided with a plurality of spaced-apart recesses 10a 10d which extend in a transverse direction in parallel with the central axis CL of the basic holder. It is intended that three clamping screws 11b-11d are received in the bores 10b-10d to be threadedly engaged in corresponding bores in a suitable engagement part (not shown), via which the basic holder 1 is secured in an appurtenant machine (not shown). In the recess 10a, which is oriented perpendicularly to the longitudinal direction of the insert 3 and the insert pocket 7, a nut roll 11a is slidably fittingly received, the axial length of the nut roll substantially responding to the thickness of the basic holder 1. Adjacent to the recess 10a, which is situated at a small distance obliquely above the clamping portion 5, there is a cylindrical bore 15, oriented perpendicularly to the recess 10a. The bore 15 extends radially inwards to a position, at a distance from the hole 9a, such that a hinge portion 17 is formed therebetween. This bore 15 is intended to receive a clamping screw 19, the lower threaded portion of which being intended to be threadedly engaged in a threaded portion 21 of the nut roll 11a. As best appears from FIG. 1, the tool head 1 also has a laterally extending slot 20 oriented parallel to, and communicating with, the recess 10a, the slot 20 being separate from the insert pocket 7. The slot 20 extends all the way through the head parallel to the axis CL, while extending centrally through the bore 15 in a direction perpendicularly thereto. In FIG. 1 it is also shown that the insert receiving clamping slot 7 extends laterally through the basic holder 1, i.e., in a direction parallel to the axis CL.

Upon threadedly engaging the clamping screw 19 in the nut roll 11a and then tightening the clamping screw 19, the nut roll 11a is pulled in the axial direction of the clamping screw, i.e., radially outwards with reference to the axis CL, such that the nut roll is displaced into the slot 20. Hereby, the slot is caused to expand and a deflection of the upper portion of the insert holder is accomplished such that the upper clamping portion 5 comes into clamping engagement with the upper surface of the cutting insert 3 and, accordingly, the cutting insert 3 is clamped in the insert pocket 7.

An advantage with this solution is that the moment arm for the force that results from tightening the clamping screw, is comparatively long, although the space for achieving this length is limited, which is typical in tools for parting and grooving of the kind mentioned. Due to the fact that the nut roll 11a moves in the axial direction of the clamping screw 19, i.e., outwardly towards the head 18, there occurs little bending of the clamping screw upon deflection of the clamping portion 5, which results in a decreased risk of bending damage to the clamping screw.

According to the embodiment of the invention illustrated in. FIG. 1, the nut roll 11a is formed substantially cylindrical, at the same time as the recess 10a adapted to receive the nut roll is formed eccentric, i.e., formed with a shape differing from a circular shape, for instance an oval shape. The eccentric design is illustrated in FIG. 1 by the eccentric portion 24, which has a curved shape differing from a circular shape. This facilitates the movement of the nut roll into the slot 20 in the axial direction of the clamping screw upon tightening of the clamping screw. However, this is by no means the only way of realizing the basic inventive idea.

According to another embodiment of the invention, the recess 10a can be formed such that the internal periphery thereof has a tapering shape in a direction towards the slot 20, for instance a conventional wedge shape, which facilitates the displacement of the nut roll 11a into the slot 20 upon tightening of the clamping screw 19.

According to yet another embodiment, the recess 10a is formed cylindrical. In that case, the nut roll 11a is, preferably, formed externally with a wedge shape. This embodiment enables, in conformity with the embodiment of the invention illustrated in FIG. 1, displacement of the nut roll 11a into the slot 20 upon tightening of the clamping screw, such that the upper clamping portion of the insert holder 4 is deflected and clamps the cutting insert 3 in the insert pocket.

Figure 2:
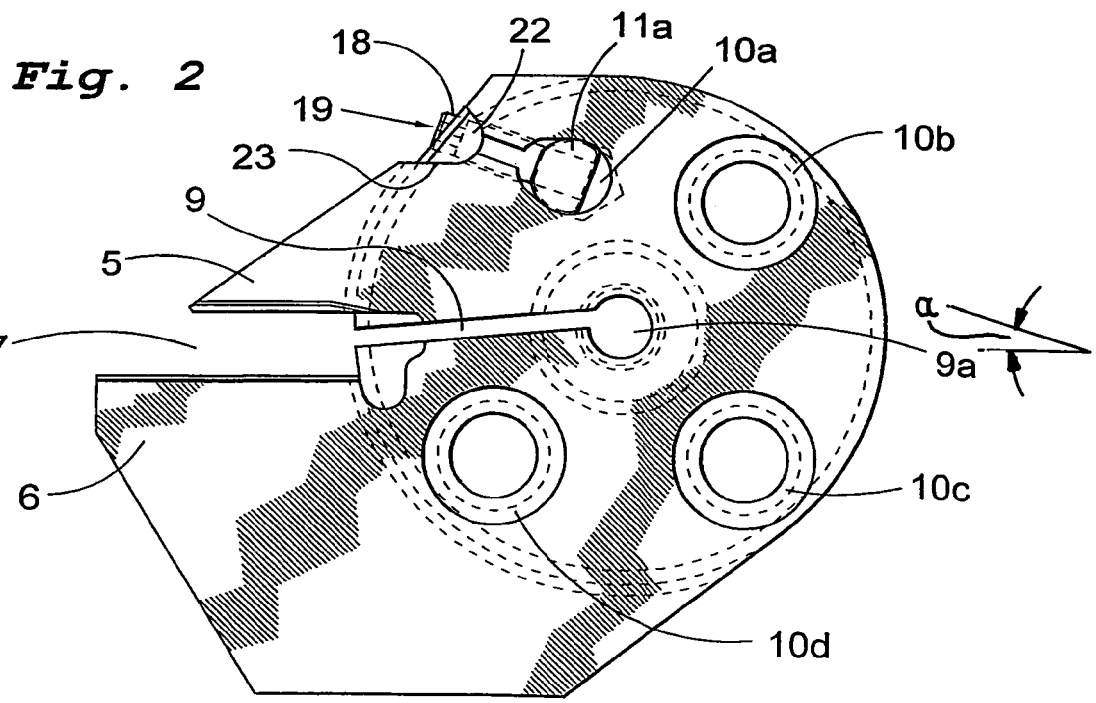
FIG. 2 is a side view of a basic holder and an insert holder integrally formed therewith according to another embodiment of the invention.

FIG. 2 illustrates a further embodiment of the invention, in which the recess 10a adapted to receive the nut roll is formed eccentric at the same time as the nut roll 11a is formed externally with a wedge shape. It is also conceivable to form the nut roll 11a externally with another shape tapering towards the slot, for instance a convexly curved surface. This combination of design of the recess 10a and the nut roll 11a, respectively, enables, in an advantageous way, the inventional movement of the nut roll in the axial direction of the clamping screw (radially outwards). According to the embodiment of the invention illustrated in FIG. 2, the clamping screw 19 is further adapted to co-operate with a fitting element 22 suited for this purpose, the upper surface of which having a plane contour and the lower surface thereof having a convexly curved contour. The fitting element 22 has a cylindrical through-hole (not shown) for receiving the clamping screw, the through-hole having a diameter smaller than the diameter of the head 18 of the clamping screw 19.

Furthermore, the clamping screw is rotatably inserted through a through-hole of the fitting element. The bore 15 of the basic holder ends with a recess 23, which has a contour substantially corresponding to the contour of the lower surface of the fitting element 22. Thus, the fitting element 22 is adapted to abut against the recess 23, while the clamping screw is freely rotatable for tightening, when inserted through the through-hole of the fitting element, the fitting element not rotating during said tightening.

According to the embodiment of the invention shown in FIG. 1, the clamping screw 19 is provided with a conical head 18, at the same time as the upper part of the bore 15 ends with an outwardly open conical recess 16. Hereby, the conical head 18 will be displaced, upon tightening of the screw 19, into the slot 20, which contributes to the deflection of the upper portion of the insert holder 4 and, accordingly, contributes to the clamping of the cutting insert 3 in the insert pocket 7.

Upon insertion of a new cutting insert 3, the clamping of the cutting insert is accomplished by tightening the clamping screw 19, whereupon the movement of the nut roll 11a in the axial direction of the clamping screw towards the screw head 18 serves for widening the slot 20 and deflecting the upper clamping portion 5 of the insert holder 4 into locking co-operation with the upper surface of the cutting insert 3. When exchanging cutting inserts, only this clamping screw 19 has to be unscrewed a little, whereby the nut roll 11a moves in the axial direction of the clamping screw 19 in a direction away from the head 18, and the width of the slot regains the smaller slot width, defined by the relaxed position, such that the cutting insert 3 can be exchanged, without the operator having to completely disengage the screw 19.

The screw receiving recess 15 should have a longitudinal extension in a direction which forms an angle a of 25-105° (see FIG. 2) in relation to the longitudinal direction of the insert pocket. Preferably, this angle amounts to about 35-90° in order to obtain an optimal moment arm for the hinge portion 17. At the same time, the basic holder 1 should, preferably, have a width which is several times the width of the insert receiving portion 4, which constitutes the cutting insert carrying holder portion.

According to the embodiments of the invention shown in FIGS. 1-2, the longitudinal extension of the cutting insert 3 should be longer than the longitudinal extension of the lower support surface 4a in the insert holder 4, which is apparent from FIGS. 1-2, such that the cutting insert 3 obtains a lateral support from the basic holder.

The invention is of course not in any way limited to the embodiments described above, but many possibilities of modifications thereof will be apparent to a person with ordinary skill in the art, without departing from the invention, such as this is defined in the appended claims.

Although the embodiments described above and shown in FIGS. 1-2 relate to a tool head primarily intended for the type of turning operations referred to as parting and grooving, many other types of tool heads can employ the invention. As a non-limiting example may be mentioned a tool head in the form of a disc-shaped milling cutter for slitting operations, having a plurality of circumferentially spaced-apart cutting inserts, each being clamped in a respective insert pocket in the manner described above.

What is claimed is:

1. A tool head adapted to receive a cutting insert for chip removal machining, comprising:
    a basic holder including an insert holder formed by a lower support part and an upper clamping portion which define therebetween an insert-receiving pocket;
    a slot extending laterally through an outer periphery of the basic holder at a location spaced from the pocket, wherein the clamping portion is joined to a remaining portion of the basic holder by a hinge portion about which the clamping portion is elastically displaceable toward the lower support part;
    a recess extending through the basic holder substantially parallel to the slot and in communication therewith;
    a nut roll positioned within the recess;
    a bore extending from an outer periphery of the basic holder though the slot radially inward, a longitudinal axis of the bore being oriented perpendicular to a longitudinal axis of the recess;
    a clamping screw extending through the bore of the basic holder and into engagement with the nut roll, said clamping screw oriented perpendicularly to said nut roll, wherein the clamping screw is operable to displace the nut roll into the slot to expand the slot and elastically displace the clamping portion about the hinge portion and toward the support part;
    wherein the recess is of tapering shape toward the slot.

2. The tool head according to claim 1 wherein the clamping screw extends through the slot and is threadedly received in the nut roll.

3. The tool head according to claim 2 wherein the clamping screw includes a conical head arranged to engage sides of the slot to widen the slot and elastically displace the clamping portion about the hinge and toward the support part.

4. The tool head according to claim 2 wherein the bore forms an angle of 35-90 degrees with a longitudinal direction of the insert-receiving pocket.

5. The tool head according to claim 1 wherein the recess is of non-circular cross section.

6. The tool head according to claim 1 wherein the recess is of circular cross section.

7. The tool head according to claim 1 wherein the recess and the nut roll are substantially cylindrical.

8. The tool head according to claim 1 wherein a portion of the nut roll facing the slot is of tapered shape.

9. The tool head according to claim 1 wherein the remaining portion of the basic holder has a first thickness in a direction parallel to the slot, and the support part and the clamping portion each have a second thickness parallel to and less than the first thickness.

10. The tool head according to claim 1 wherein the insert-receiving pocket transforms into an extension having a shorter height than the insert-receiving pocket.

11. The tool head according to claim 1 wherein said pocket terminates in a support surface extending substantially perpendicular to a longitudinal direction of the pocket.

12. The tool head according to claim 1 wherein the insert receiving pocket extends transversely relative to the recess, the slot, and the hinge portion.

13. A metal machining tool comprising a tool head and a cutting insert removably mounted therein, the tool head comprising:
    a basic holder including a lower support part and an upper clamping portion defining therebetween an insert-receiving pocket in which the cutting insert is removably mounted, wherein a longitudinal length of the cutting insert is longer than a longitudinal length of the pocket;
    a slot extending laterally through an outer periphery of the basic holder at a location spaced from the pocket, wherein the clamping portion is joined to a remaining portion of the basic holder by a hinge portion about which the clamping portion is elastically displaceable toward the cutting insert;
    a recess extending through the basic holder substantially parallel to the slot and in communication therewith;
    a nut roll positioned within the recess;
    a bore extending from an outer periphery of the basic holder through the slot radially inward, a longitudinal axis of the bore being oriented perpendicular to a longitudinal axis of the recess;
    a clamping screw extending through the bore of the basic holder and into engagement with the nut roll, said clamping screw oriented perpendicularly to said nut roll, wherein the clamping screw is operable to displace the nut roll into the slot to expand the slot and elastically displace the clamping portion about the hinge portion and toward the cutting insert;
    wherein the recess is of tapering shape toward the slot.

* * * * *